No. 668,292. Patented Feb. 19, 1901.
F. J. JOHNSTON.
VEHICLE TIRE.
(Application filed Dec. 4, 1900.)
(No Model.)

Witnesses,
F. A. Bayless

Inventor,
Francis J. Johnston
By Dewey Strong
Atty

UNITED STATES PATENT OFFICE.

FRANCIS J. JOHNSTON, OF SACRAMENTO, CALIFORNIA.

VEHICLE-TIRE.

SPECIFICATION forming part of Letters Patent No. 668,292, dated February 19, 1901.

Application filed December 4, 1900. Serial No. 38,652. (No model.)

*To all whom it may concern:*

Be it known that I, FRANCIS JOHN JOHNSTON, a citizen of the United States, residing at Sacramento, county of Sacramento, State of California, have invented an Improvement in Vehicle-Tires; and I hereby declare the following to be a full, clear, and exact description of the same.

My invention relates to improvements in vehicle-tires.

It consists, essentially, of a tube or casing, of rubber or like resilient material, inclosing a light elastic body—as cork, pith, or like substance—of means by which this filling may be bound and held tightly in position, and of details more fully to be set forth in the following specification and accompanying drawings, in which—

Figure 1:
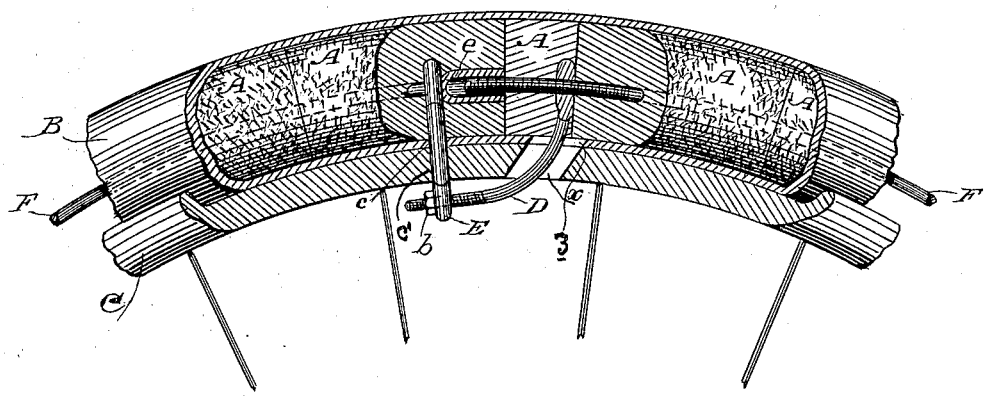
Figure 2:
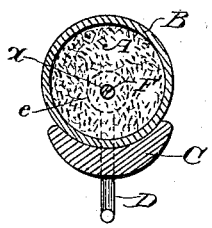
Figure 3:
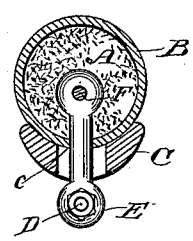
Figure 4:
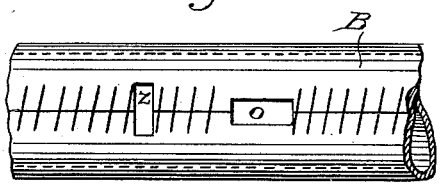

Figure 1 is a portion of the tire. Fig. 2 is a cross-section through the same. Fig. 3 is a similar section in line with the stud. Fig. 4 is an external view of the same.

Having reference to the drawings, C represents, for instance, the rim of a bicycle. However, my invention is equally applicable to vehicles of all kinds, as buggies, sulkies, &c.

B is the usual outer tube, of rubber. Within B is arranged the filling A, which may be cork, pith, porous rubber, or like substance. This filling is in sections, having a perforation, as $a$, Fig. 2, through which runs a binding-rod F. One end of this rod is threaded and the other terminates in a socket $e$, so that when the sections of filling have been "strung" on this rod the ends of the rod within the tube B may be brought together, as shown in Fig. 1. This tube B is laced, as in Fig. 4, or may be otherwise provided with suitable means for closing the opening through which it is necessary to insert the filling.

Near the point where the ends of the binding-rod are brought together the rim is perforated, as at $c$ and $x$, Fig. 1, and registering therewith are perforations $z$ and $c'$, Fig. 4, in the tube. These perforations are for the passage of the connecting-stud E and the connecting-rod D. The rod E abuts against the shoulder of the socket $c$. The rod D is made right angular for the purpose shown in Fig. 1 and is threaded, so as to be adjustable upon the binding-rod F.

By means of a set device, as the nut $b$, tension is exerted upon the binding-rod and the filling A is bound and held firmly in place. Some form of waterproof cement is generally used to secure the tire to the rim, though the action of the binding-rod F is in itself sufficient for the purpose.

The advantages claimed for my tire are that it is unaffected by puncture, is light, resilient, and durable, has the appearance of a regular pneumatic tire, and for ordinary vehicles is better adapted than the pneumatic tire. It is noiseless. By the use of the filling in sections I am enabled to renew any part of it at any time without loss of the whole tire.

Having thus described my invention, what I claim as new, and desire to secure by Letters Patent, is—

1. A vehicle-tire consisting of an outer tube of resilient material, a filling of light elastic material in transverse sections, centrally pierced, a binding-rod running through these sections, means for connecting the ends of the rod, and means extending from the ends of the rods through the rim by which the ends of the rod are adjusted from outside the tire.

2. A vehicle-tire having in combination, an outer tube of resilient material inclosing a filling of cork, pith or like substance, said filling arranged in sections and having a perforation through which runs a binding-rod, one end of this rod terminating in a socket in which the other end of the rod is slidable, and means extending from the ends of the rod through the rim for drawing these two ends together from a point outside the tire.

3. The combination in a vehicle-tire of an outer tube of resilient material, a filling of cork, pith, or like substance sectionally divided and having a longitudinal perforation through which runs a binding-rod, one end of this rod terminating in a socket, and the other and threaded end of the rod slidable therein, a stud upon the socket end of the rod, a connecting-rod upon the threaded end of the binding-rod, said stud and connecting-rod extending without the tire, and by which the ends of the binding-rod are brought together.

In witness whereof I have hereunto set my hand.

FRANCIS J. JOHNSTON.

Witnesses:
 J. J. BUCKLEY,
 LOUIS G. NIXON.